Figure 1:
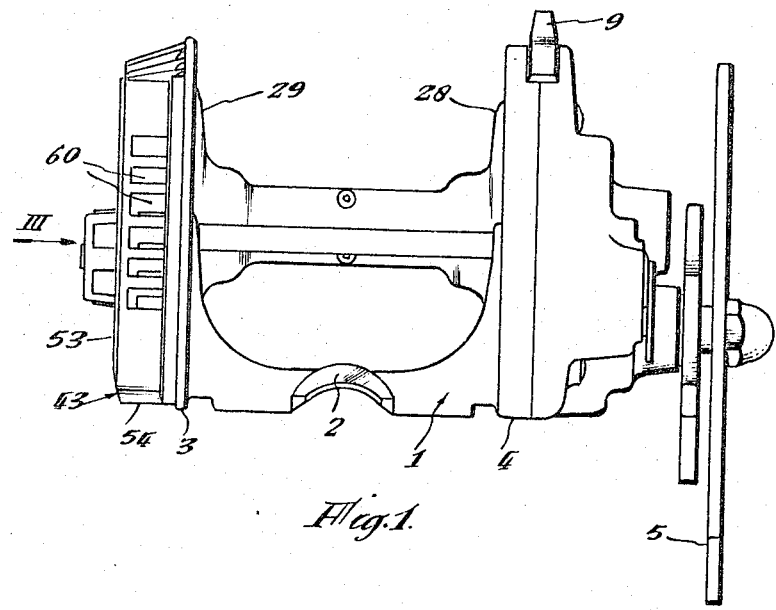

May 2, 1967 K. P. MORRITT 3,317,159
ROTATING SPOOL FISHING REEL WITH AIR BRAKE
Filed Nov. 25, 1964 3 Sheets-Sheet 2

Inventor
Kenneth Patrick Morritt
by Albert Jacobs
Attorney

Inventor
Kenneth Patrick Morritt
by Albert Jacobs
Attorney

United States Patent Office 3,317,159
Patented May 2, 1967

3,317,159
ROTATING SPOOL FISHING REEL WITH AIR BRAKE
Kenneth Patrick Morritt, Cheam, England, assignor to K. P. Morritt Limited, Cheam, Surrey, England
Filed Nov. 25, 1964, Ser. No. 413,769
Claims priority, application Great Britain, Nov. 28, 1963, 47,052/63
10 Claims. (Cl. 242—84.52)

This invention relates to improvements in or relating to fishing reels of the kind wherein the spool rotates to dispense or wind-on fishing line, hereinafter called a fishing reel of the kind described.

One end of the axle which forms the axis of rotation of the spool may be driven directly by a handle or may be provided with pinion gearing driven by a handle in which latter case the reel is known as a "multiplying reel." Such reels are usually equipped with a disengaging means between the spool and the handle for use when casting so that the spool, on which fishing line is wound, may spin freely to allow the line to be fed from it. The spool is made as light as possible in order not to hinder the cast being made, but even with a light spool there is difficulty for the inexperienced fisherman in that he may cast unevenly and cause an over great initial acceleration of the spool, which will then tend to overrun the line being cast, as that line slows down.

It has been proposed to provide mechanical friction braking for the spool but the characteristic of such a mechanical brake is that it causes an even deceleration of the spool whatever speed the spool is rotating at and this causes a different, greater, deceleration of the spool during the middle portion of the cast from that which would be natural if the cast had been perfect and had followed the natural deceleration of the line. The effect therefore of a mechanical brake uniformly applied is to shorten the length of the cast.

It is proposed to apply to a reel of the kind described air braking means having a deceleration characteristic suitable for an unskillful angler, but which is adjustable to have a greater or lesser amount of braking effect at each cast, a desirable amount being governed by weather conditions and by the skill of the angler.

According to the invention I provide a fishing reel of the kind described wherein the spool rotates a centrifugal fan arrangement, a reel casing providing apertures leading air to and from the centrifugal fan, and means whereby one of the apertures can be varied in effective size. The spool may be provided with a plurality of vanes forming a centrifugal fan arrangement, a casing portion at that end of the spool being provided with a first aperture at a radially central portion and a second aperture at a radially outer portion to form an inlet and outlet respectively for air to and from the centrifugal fan, and means whereby one of the apertures can be varied in effective size. The casing portion may be of cup form with the second aperture in the cylindrical portion of the cup, and the first aperture at the radially central portion of the base of the cup. The second aperture may be variable in effective size by rotation of the cup portion so that the second aperture is more or less obscured by impermeable means, fast with a stationary part of the reel. Alternatively, the cup portion may be fast with a stationary part of the reel, the first aperture comprising a plurality of segmental ports, the effective size of the first aperture being varied by rotational movement of a segmented shutter relative to the aperture.

The fishing reel according to the invention may comprise a reel of the kind described wherein a stationary axle is provided in the reel, the spool being rotatable about this axle. The spool may be supported by two stationary axles of stub form.

The fishing reel according to the invention may comprise a spool with a hollow axial shaft housing a rolling contact bearing.

Figure 2:
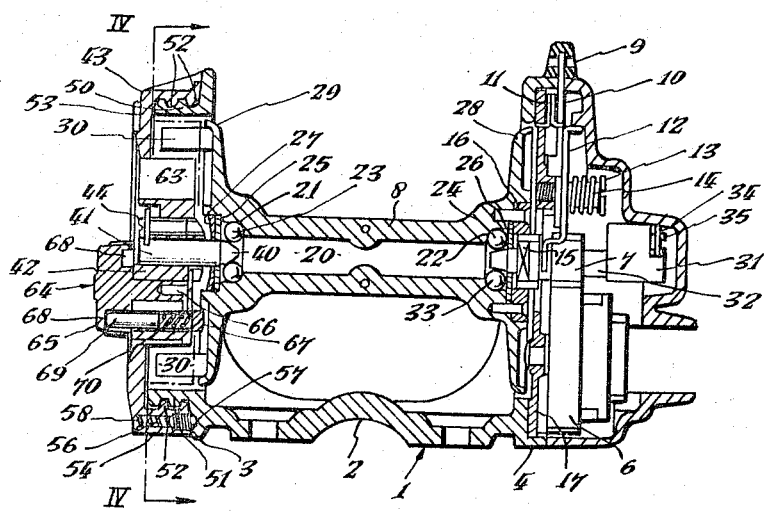
Figure 3:
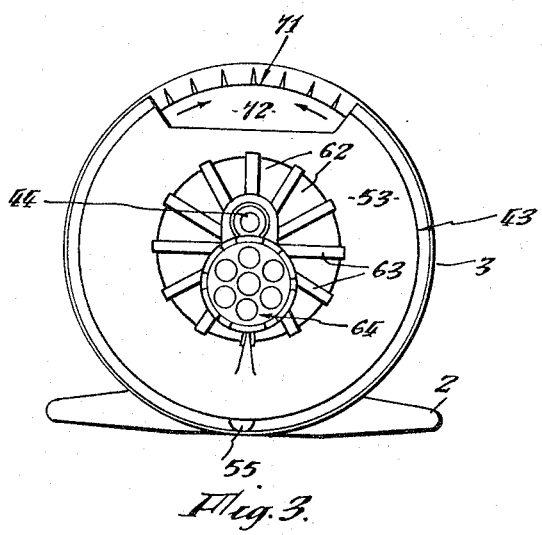
Figure 4:
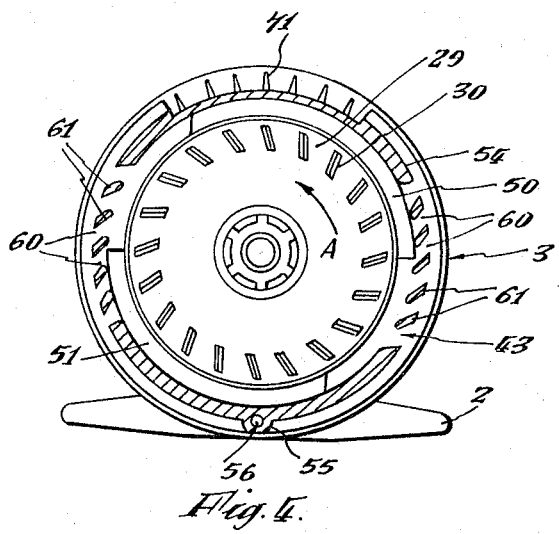
Figure 7:
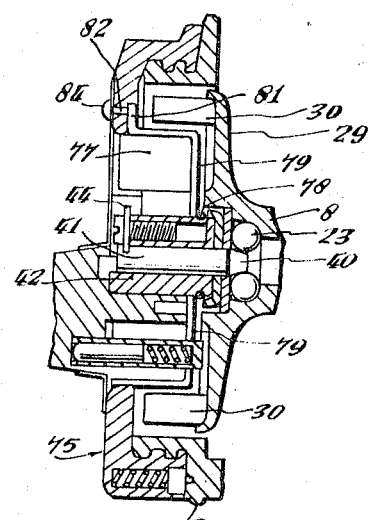
Figure 6:
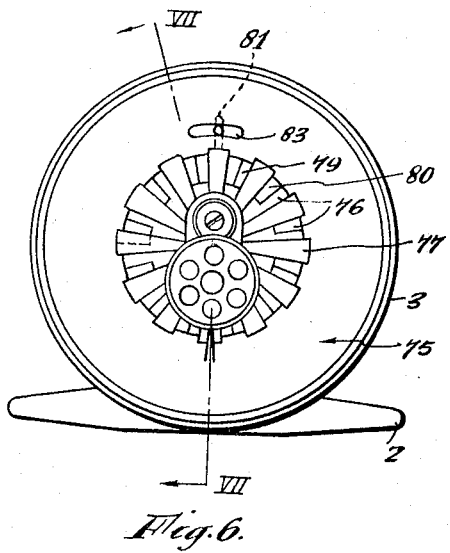
Figure 5:
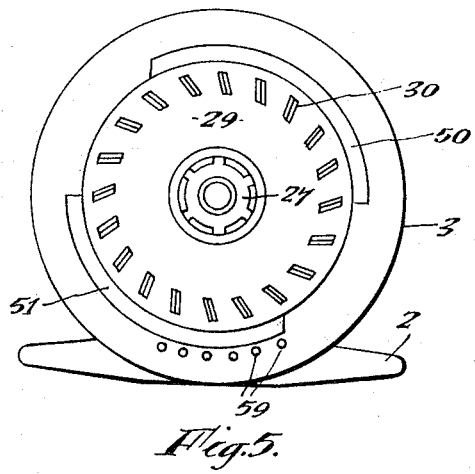

Particular embodiments of the invention will now be described with reference to the accompanying drawings wherein:

FIGURE 1 is a rear view of a first embodiment,
FIGURE 2 is a diametrical sectional elevation through part of FIGURE 1,
FIGURE 3 is a view on the line of the arrow III, FIGURE 1,
FIGURE 4 is a section on the line IV—IV of FIGURE 2,
FIGURE 5 is a view in the direction of the arrow III, FIGURE 1 with part of a casing portion removed,
FIGURE 6 is a view of a second embodiment taken in the direction corresponding to that of arrow III, FIGURE 1 and
FIGURE 7 is a section on the line VII—VII of FIGURE 6.

The embodiment in FIGURE 1 consists of a reel casing 1, conveniently made of metal or of plastics material, having a bridge portion which includes a channel part 2 for attachment to a fishing rod. The bridge portion of the casing 1 spaces apart two end portions 3 and 4 of the casing upon one of which there is mounted a driving handle 5 and driving gearing 6, 7, together with the mechanism for disengaging the drive handle 5 from a rotatable spool 8 which is mounted between the end portions 3 and 4. The mechanism consists of a setting knob 9 which moves a plate 10, spring loaded by spring 11, to cause selector plate 12 to adopt either the position which is shown in FIGURE 2, or a position in which the plate is urged outwardly on its mounting screw 13 (against resilient loading due to a spring 14) to slide the driving gear 7 to a position where it is withdrawn from the end of the spool 8 to be disengaged from it. See Patent No. 2,652,991. The end 15 of the gear 7 may be formed as part of a dog clutch, part 16 of the end of the spool to form a corresponding dog clutch part.

The spool 8 has a hollow axial hub 20 which has enlargements 21, 22 at its axial ends. The spool is formed of nylon impregnated with fiber glass. The use of this material and the construction of the spool with a hollow shaft allow for lightness of the spool. The axially outwardly and radially inwardly facing surfaces of the enlargements 21, 22 form outer races for ball bearings 23, 24 which are secured within races by a washer 25, 26. The washer 25 is held in position by a circlip 27 abutting in a suitably shaped recess in that end of the spool; the washer 26 is held in position by the dog clutch part 16 provided at that end of the spool. The spool has two endplates one of which, 28, is substantially planar but the other of which 29, is provided with a plurality of vanes 30 near its circumference. The vanes 30 are disposed near the circumference of the spool end plate 29, each at a slight angle to the radius passing from the axis of the spool to the center line of the vane and, in the example shown, twenty four vanes are so disposed around the edge of the plate. The arrangement of the vanes is such that upon rotation of the spool for instance in the sense of the arrow A, FIGURE 4, they tend to force air radially outward; that is, they form a centrifugal fan arrangement.

The arrangement for mounting the spool within the reel for rotation will now be described. At the end 4 of the reel casing 1 there is provided a back plate 17 from which is supported by an arm (which is not shown) a hub forming member 31. This has a bore in which there fits one end of a stub axle 32 which has at the other end a frusto-conical portion 33. The axle 32 has a slot perpendicular to its longitudinal axis into which there fits a flange 34 of a flange headed screw 35 which, by being screwed into a screw-threaded housing in the hub portion 31 secures the axle 32 in that hub portion fixedly but removably. When so secured the frusto-conical end portion 33 forms the inner race for the ball bearings 24. The drive gear 7 is rotatable about the axis 32 and also is axially displaceable along it by means of the fork 12 in the way which has been described.

At the other end of the spool, an inner race is provided for the ball bearings 23 by the frusto-conical end 40 of a stub axle 41 similar to axle 32 which is secured in a hub portion 42 of a reel casing portion 43 (which will be described in more detail later by a flange headed screw 44 in a manner similar to that described with reference to the stub axle 32. Again, the stub axle 41 remains stationary, the two stub axles being co-axial so that the spool is freely rotatable about them. One or other of the screws 35, 44 may be provided with a friction washer so that it need not be screwed completely into its housing and yet would remain in its set position. This affords means for adjusting the distance apart of the axles 32, 41.

The construction of the casting end part 43 and its associated parts will now be described with reference to FIGURES 1, 2, 3, 4 and 5. The reel casing 3 has two arcuate diametrically opposed separate securing flanges 50, 51 which each are formed with grooves 52 in their radially outer surface. The grooves 52 extend parallel to each other and perpendicular to the axis of rotation of the spool 8, that is, they do not form a screw-thread.

The casing portion 43 is conveniently made of plastics material and is of cup form. It has a substantially planar face 53 (which forms at its center portion the hub 42 for the stub axle 41) and a cylindrical surround 54. On the cylindrical inner surface of the surround 54 there are formed, over a certain arcuate length of that wall, inwardly projecting parallel ribs which will mate with the grooves 52 in the flanges 50, 51 of the fixed casing 3. The ribs are of a length to afford a stable engagement between the casing portion 43 and the flanges 50 for relative rotation of those parts but are short enough to allow, when the casing portion 43 is rotated to a suitable position relative to those flanges 50, 51 that they correspond to gaps between the parts 50, 51, so that the whole of the casing portion 43 may be removed.

At one position in the surround 54 there is provided an enlargement 55 which provides a blind aperture 56 in which there is mounted a ball 57 resiliently urged towards the reel casing part 3 (when the casing portion 43 is in position) by a spring 58. A plurality of small recesses 59 provided in the face of the casing part 3 (FIGURE 5) and the ball 57 by tending to seat in these recesses provides a number of preferred positions of the casing portion 43.

The cylindrical cup portion 54 is interrupted at two diametrically opposite parts to provide a plurality of ports 60. These ports 60 are the same length in the axial direction as flanges 50, 51, and the division between the ports is formed by skew plates 61 which at their radially innermost end almost abut against the radially outer surface of the flanges 50, 51. The distance over which apertures 60 are provided in each side of the cup portion 54 is the same as the arcuate distance between nearest ends of the flanges 50, 51 (at the radius of those flanges and it is less than the length of the flanges 50, 51.

The center portion of the casing portion 43 surrounding the hub 42 is formed with a plurality of segmental ports 62 (forming an inlet aperture) separated by radial spokes 63 which extend from the level of the outside face 53 of the casing portion 43 to close to the end plate 29 of the spool 8, as is best seen in FIGURE 2, and extend radially to close to the radial inner edge of the vanes 30. The radial spokes provide a support for the hub portion 42 as well as for a mechanical friction brake 64 which consists of a control knob 65 rotatably mounted on a pin 66 on the casing end part to press adjustably a brake pad 67 against the end plate 29 of the spool through a face cam 68, a cam follower 69 and spring 70.

It is seen from the drawing that the circumference of the end plate 29 is brought as close as possible to the cylindrical inner face of the reel stationary casing part 3 so that there is as little air gap as possible between those two parts.

The casing end portion 43 is formed with one part 71 of its circumference with a plurality of radially projecting spines to afford a grip to the hand of a user, and a suitable legend or information may be provided on a planar slightly recessed part 72 near those spines.

To vary the effective aperture offered by the ports 60, the casing portion 43 is held by the user and rotated in the appropriate direction, into one of the preferred positions in which the ball 57 engages a recess 59. In the position shown in FIGURE 4 the effective apertures offered by the ports 60 is half the total aperture, or number of ports, available. If the casing portion 43 were rotated anti-clockwise from the position shown in that figure more ports 60 would be obscured by the end of the flanges 50, 51 (which of course prevent passage of air) and a position is available where the ports are completely closed by those flanges—the effective aperture is then nil, though slight air leakage may occur between the plates 61 and the flanges 51, 50, and at the circumference of the spool end plate 29.

The rate at which air can pass through the casing portion 43 (entering through the aperture 63, being impelled outwardly by the rotating vanes 30 on the spool end 29 and out through the ports 60) depends of course on the speed of rotation of the spool and the effective outlet aperture. At a given speed of rotation of the spool, the larger the effective outlet aperture the greater will be the rate of air flow and the air braking effect.

The embodiment shown in FIGURES 6 and 7 (where parts similar to those described with reference to the previous embodiment are given like reference numerals) has means whereby the effective size of the inlet aperture can be varied. In this case the casing part 75 corresponding to casing portion 43 is held stationary on the casing end part 3. It has a plurality of outlet ports corresponding to ports 60 which are at all times fully available for flow of air. The center portion of the casing member 75 is provided with a plurality of segmental ports 76 similar to the segmental ports 62 and with spokes 77 resembling spokes 63. Here, however the walls of the spokes are truly radial of the central axis of the axle 41. The outer surface of the hub portion 42 is adapted to form a recessed housing for a circlip 78 which holds a cup member 79 against the axially inner side of the ends of the spokes 77. The cup member 79 has a plurality of segmental apertures 80 each of which corresponds in circular angle to that part of an aperture 76 which it underlies. The apertures 80 are formed both in the planar base of the dish member 79 and in its cylindrical walls. The cup member 79 forms a shutter, and is rotatable about the hub 42. The cup member has an arcuate slot through which the axially inner end of the brake 64 passes. Means for controlling the amount of this rotation are provided by a lug 81 projecting radially from the lip of the cup and having fast with it a pin 82 which projects through a slot 83 in the casing end part 75 and which is provided with a handling knob 84. By movement of the pin 82 in the slot 83 and rotation of the shutter the effective inlet aperture of the fan forming the air brake is varied, with the same effect as that described for the previous embodiment.

What I claim and desire to secure by Letters Patent is:
1. A fishing reel comprising a spool, an axle, a spool end plate, a reel casing, a casing portion of the reel casing having a radially central and a radially outer portion, air passages in the casing portion, control means, and centrifugal fan vanes on the spool end plate, the axle being fast with the casing portion, a first of the air passages about the axle being in the radially central portion of the casing portion, a second of the air passages being in the radially outer portion of the casing portion, the spool being rotatable about the axle, the centrifugal fan vanes being between the first and second air passages, and the control means controlling the effective size of one of these passages.

2. A fishing reel as claimed in claim 1 wherein the spool comprises a hollow axial hub, a housing within at least one end of the hub, the axle projecting into the hollow end of the hub, and a rolling contact bearing having roller means abutting against and rolling on the axle and on the housing.

3. A fishing reel as claimed in claim 1 wherein the air passages in the casing portion each comprise a plurality of ports, the control means comprises air-impermeable means, the control means and the casing portion being relatively movable to cause the air-impermeable means to obscure a given proportion of the plurality of ports of one of the passages.

4. A fishing reel as claimed in claim 3 wherein the control means comprises a plurality of stationary port-defining members, the plurality of ports defined by them forming a second passage, an air-impermeable member fast with the reel casing, means for rotatably mounting the casing portion, means for rotating the casing portion such that the second passage is variably obstructed by the air-impermeable member.

5. A fishing reel as claimed in claim 4, wherein the air-impermeable member when partially obstructing the second passage wholly closes a portion of its ports, others being wholly open.

6. A fishing reel comprising a spool, a spool axis, spool mounting means, a reel casing having two ends, an axle borne by the reel casing, the spool being mounted in the reel casing, and the axis of the spool lying between the two ends of the reel casing, a first casing portion at one end of the casing, a second casing portion at the other end of the casing, the spool being rotatable about its axis on the axle, passages in the second casing portion, centrifugal fan means rotatable with the spool, and the passages in the second casing portion placing the fan means in communication with the atmosphere surrounding the reel, control means variably governing the amount of air passing through the passages on rotation of the centrifugal fan means with the spool.

7. A fishing reel as claimed in claim 6 wherein the second casing portion mounts a second axle fast with it, co-axial with the axle of the first casing portion, the two axles being stub axles, and the spool being rotatable on the axles about its axis.

8. A fishing reel as claimed in claim 6 wherein the first casing portion has a radially oute rpart, one air passage at the radially outer part of the casing portion, and air-impermeable means on the reel casing such that upon rotation of the casing portion, one air passage is obstructed by the air-impermeable means.

9. A fishing reel as claimed in claim 6 wherein spool has an end plate, the centrifugal fan means comprises propeller means fast with the spool end plate, the second casing portion has a radially central portion mounting an axle, the spool is rotatable about this axle, and the passages in the second casing portion are provided radially inwardly of and radially outwardly of the propeller means.

10. A fishing reel as claimed in claim 6 wherein the centrifugal fan means includes vanes projecting axially from an end plate of the spool, and the passages in the casing portion are one radially inside and one radially outside the vanes.

References Cited by the Examiner

UNITED STATES PATENTS

| 2,282,995 | 5/1942 | Dumond | 242—84.44 |
| 2,384,561 | 9/1945 | Muffett | 242—84.52 |
| 2,415,670 | 2/1947 | Black et al. | 188—90 |
| 3,034,604 | 5/1962 | Holmes | 242—84.5 X |

FOREIGN PATENTS

| 15,670 | 1910 | Great Britain. |

FRANK J. COHEN, Primary Examiner.

BILLY S. TAYLOR, Examiner.